(12) United States Patent
Rog

(10) Patent No.: US 6,816,539 B1
(45) Date of Patent: Nov. 9, 2004

(54) MULTIPLE-CHANNEL DIGITAL RECEIVER FOR GLOBAL POSITIONING SYSTEM

(75) Inventor: Andrey L. Rog, Moscow (RU)

(73) Assignee: Samsung Electronics Company, Limited, Gyungki-do (KR)

( * ) Notice: Subject to any disclaimer, the term of this patent is extended or adjusted under 35 U.S.C. 154(b) by 0 days.

(21) Appl. No.: 09/508,936

(22) PCT Filed: Jul. 20, 1998

(86) PCT No.: PCT/RU98/00230

§ 371 (c)(1),
(2), (4) Date: Jun. 9, 2000

(87) PCT Pub. No.: WO00/05741

PCT Pub. Date: Feb. 3, 2000

(51) Int. Cl.$^7$ ................................................. H04B 1/69
(52) U.S. Cl. ..................................................... 375/147
(58) Field of Search ................................. 375/147, 130, 375/150, 367, 343, 346

(56) References Cited

U.S. PATENT DOCUMENTS 6,133,876 A * 10/2000 Fullerton et al. ........... 342/375

* cited by examiner

Primary Examiner—Khai Tran
(74) Attorney, Agent, or Firm—Sughrue Mion, PLLC

(57) ABSTRACT

The invention relates to systems for receiving a digital radio signal and, more particularly, to receivers of radio signals, coded with a pseudo-noise sequence, which are used in global positioning system GPS (USA) and GLONASS (Russia), allowing a compensation effect for the narrow-band interference by using a device, controlled by the processor, with an automatic gain control, multilevel analog-to-digital converter, and additional correlation channel for detection of sinusoidal interference consisting of the digital generator having quadrature mixers and accumulators. Information from output of the of accumulators is read by a processor, in which is detected the presence (or absence) of interference, and the amplitude is evaluated. Therefore, the processor generates control signal directing amplification in the device using an automatic gain control.

7 Claims, 7 Drawing Sheets

A) SIGNAL CODED BY A PSEUDO-NOISE SEQUENCE

B) SIGNAL CODED BY A PSEUDO-NOISE SEQUENCE AND BY SINUSOIDAL INTERFERENCE

MULTIPLE-CHANNEL DIGITAL RECEIVER FOR GLOBAL POSITIONING SYSTEM

TECHNICAL FIELD

The present invention relates to systems for receiving digital radio signals and, more specifically, the invention relates to receivers of radio signals encoded by a pseudonoise sequence, which are used in the global positioning systems GPS (Global Positioning System) (USA) and GLONASS (Global Navigational Satellite System)(Russia).

BACKGROUND

Global positioning systems such as GPS (Global Positioning System) (USA) and GLONASS Global Navigational Satellite System) allow a user with a passive receiver of digital signals to generate an exact definition of the user's coordinates (longitude, latitude, altitude,) and time. (Cf. "Global Navigational Satellite System—GLOSNASS. The Interface Control Document." KNITS VKS Russia, 1995. See also "Global Position System. Standard Positioning Service. Signal Specification". USA, 1993). The navigational radio signal transmitted by the global positioning system satellite is a multicomponent phase-manipulated signal, in which the signal of a carrier frequency L1 of about 1.6 GHz is modulated by a coherent pseudonoise binary sequence ±1 (phase manipulation on TL radian) having a length of 1023 characters (GPS) or 511 characters (GLOSSNAS). The pulse-repetition rate of the modulating sequence is equal to 1.023 MHz for the GPS and 0.511 MHz for the GLONASS, with the pulse-repetition period being 1 ms. Application of the method of digital reception and the correlation of a similar broadband digital signal allows for the successful reception and decoding of a very low amplitude signal located much below the level of natural thermal noise. Thus, in the case of the GPS C/A signal, its level is from −157 dBW up to −160 dBW so that at a standard density of thermal noise of −205.2 dBWILz and a minimum band of the radio-frequency channel of 2 MHz results in a signal-to-noise ratio of 14.8 dB to −17.8 dB.

In addition, the application of the method of reception and digital processing of broadband phase-manipulated signals allows one to reduce essentially the negative effect of the narrow-band interference which often results in a failure of reception of the narrow-band amplitude-modulated or frequency-modulated signals. Nevertheless, the suppression of the narrow-band (sinusoidal) interference for a digital receiver of a pseudonoise signal (PNS) is critical, especially in the case of high-power pseudonoise interference whose amplitude overcomes that of the thermal noise. Furthermore, the GLONASS is a system with a frequency division of the signals for the receiver based on the GLONASS system, while for the combined GPS/GLONASS receivers the width of the radio-frequency channel is broadened approximately to 10 MHz. The use of the "narrow correlator" technique also results in broadening the radio-frequency band of the receiver. (Cf. .J. Dierendonck, P. Fentor, N. Ford in Theory and Performance of Narrow Correlator Spacing in GPS Receiver", Navigation: Journal of the Institute of Navigation vol. −39, No.3, Fall 92). The extension of the range of the radio-frequency channel result in an increase of probability of catching a high-power narrow-band interference, and, as a consequence, it is necessary to provide means for dealing with this interference.

Known in the art is a method of using the adaptive analog-to-digital converters enabling the narrow-band interference on the digital PNS receiver operation to be reduced. (Cf. Frank Amoroso, Jacob L. Bricker "Performance of the Adaptive ADC in Combined CW and Gaussian Interference, IEEE Transactions and Communications, vol. COM-J4, No.3, March 1986)[1]. Using a two-bit adaptive ADC as a digitizer with a variable quantization threshold $\Delta$, it is possible to reduce significantly the effect of the narrow-band interference on the operation of a digital correlator.

Also known in the art is a receiver for decoding a complex signal consisting of many PNS. The receiver comprises a reference generator, an automatic gain control (AGC) device having an input for complex PNS and an input for a signal controlling the amplification factor, a multilevel adaptive ADC converter whose input is connected to the AGC output and the clock input is connected to output of the reference generator. The converter produces at its output in-phase I and quadrature Q components of the complex signal. The receiver also has a set of digital counters, in which each counter calculates a value of digitized signals in one of the channels whose amplitude is within a preset quantization interval, and a control device reading the output values of the counters and producing a gain control signal on the basis of the analysis of the obtained data. See Patric Fenton, Kkwok-Ki K. Ng,. Thomas J. Ford in "Mulichannel Digital Receiver for Global Positioning System", U.S. Pat. No. 5,101,416.

One of the feature of the present invention is that, given a multilevel ADC converter and calculating the percentage of the digitized signals appearing between two adjacent quantization thresholds, it is possible to evaluate how the distribution function of the digitized complex signal corresponds to the Gaussian. Thus, in an exemplary embodiment of the present invention, a 6-level complex quantizer is provided, at output of which the quadrature components can take values ±1, ±2, and ±3. By setting the value of the A-distances between quantization thresholds, one can achieve the necessary ratio of a value of digitized signals appearing in one or another quantization interval. In the present embodiment it is suggested to use a ratio of 49%, 32%, and 19% for the signals from the intervals +1, ±2, and ±3 corresponding to the quantization interval $\Delta$=.66$\sigma$, where a is the square root from the dispersion of the Gaussian distribution.

The deviation from the given distribution points to the presence of narrow-band interference which can be compensated for by changing the gain of the AGC circuit and the quantizer output values. In this embodiment the presence of the narrow-band interference is recorded, when all quantized values are only in four of the six quantized intervals, i.e. the distribution will be 49%, 51%, and 0% for the signals from the intervals of ±1, ±2, and ±3. In this case the presence of narrow-band interference stated and the quantization threshold is changed so that the digitized values in the intervals corresponding ±1 is equal to 85%; ±2 is −15%; and ±3 is −0%. In so doing the numerical values of quantized values are changed: ±1 are replaced by 0, i.e. 85% of signals below the quantization thresholds ±$\Delta$ are ignored; ±2 are replaced by ±1; and ±3 are replaced by 0. Thus, during further calculations only the approximately 15% of digitized signals occurring within $\Delta$ <| signal amplitude |<2$\Delta$, are taken into account in correlator channels.

The disadvantages of the offered device include, first, the fact that it requires application of technically complex multilevel multibit analog-to-digital converters (AID), and, second, at some points of the distribution function it is possible to make only a rough estimate of the amplitude of the narrow-band interference, which, in turn, lead to a coarse gain control for changing the quantization thresholds. In the above example, the discrete adjustment: 49%, 51%, and 0% are replaced by 85%, 15%, and 0%. At each ratio $V_{si}/\sigma$, where $A_{si}$ is the sinusoidal interference amplitude and a is the Gaussian noise dispersion, it is possible to select the best value of the quantization thresholds to minimize the effect of the narrow-band interference on the useful signals.

DISCLOSURE

The basic object of the invention is the development of a digital PNS receiver compensating the effect of the narrow-band interference and allowing the removal of the above-said disadvantages due to the direct detection of the narrow-band interference, estimation of its amplitude, and installation of an optimal quantization threshold for the measured ratio $V_s/\sigma$. The given solution also allows the ADC to be simplified to a maximum extent, because even the three-level quantizer (0, ±1) makes it possible to perform effective suppression of the interference signals by means of correctly selecting the quantization threshold value.

This result is achieved because the receiver is provided with a multichannel correlator, in which, in addition to the conventional correlation of the PNS channels, which are usually represented by a correlator with an exact copy of the pseudonoise signal and a correlator early-minus-late copies of the pseudonoise signal, it has an additional correlator for detecting the narrow-band sinusoidal interference. The given channel includes a digital controlled carrier generator, which generates quadrature phase counts. The channel also comprises digital correlators and accumulators for storing the quadrature components. The correlator also comprises digital counters counting the number of counts in each quantization interval for a predetermined time period. In the case of three-level quantization this number of counts equal to −1, 0, or +1, calculated in an interval for providing statistical assurance, for example, such as N counts >$10^4$. By reading the values from the accumulators of the additional channel and comparing these values with the detection threshold, the processor makes a decision on the presence of narrow-band interference and evaluates its amplitude. Depending on the evaluated $V_{si}/\sigma$ ratio, the processor determines the optimal relations between the quantity of counts for each quantization interval and adjusts the quantization thresholds Δ and amplification factor AGC. Thus, the value of thresholds Δ can be checked by the amount of counts of the value being quantized within the preset quantization interval.

Generally, the essence of the described invention is that when a sinusoidal noise signal is superimposed on the PNS noise, the signal-to-noise after the quantization depends essentially on the sinusoidal interference and on the quantization thresholds. This dependence is illustrated by FIG. 1, where in graph 1(*a*) the a pure pseudonoise signal is shown, and in graph 1(*b*) illustrating the same signal but in a combination with the sinusoidal interference. As it is clearly seen in graph 1(*b*), the number of the PNS chips which can be distinguished on the interference background, increases at a choice of a threshold V2>V1. Also, setting the digitization value in such a manner that the signal at the output of the ADC A =0 corresponds to all V of the <V2 signal, removes the effect of the noise caused by the ambiguity of the PNS resolution on the background of the high-power sinusoidal interference.

The problem of selection of the useful PNS on a noisy background is much more difficult, as the useful signal is received on the background of a combination of the thermal Gaussian noise and sinusoidal interference. Thus, the distribution of the probability density of the signal value in the case of sinusoidal interference $V_o \sin((\Omega t))$ is described by the function:

$$\rho(v) = \frac{1}{\pi\sqrt{1-(v/v_0)^2}}, |v| \leq v_0$$

$$\rho(v) = 0, |v| > v_0$$

Using a method stated in [1], and considering that Gaussian thermal interference, sinusoidal interference, and the digital signal are values that are statistically independent, the efficiency of digitization of a signal through an effective amplification factor can be determined:

$$G = \left[\frac{V_a/\sigma_a}{V_i/\sigma_i}\right]^2,$$

where $V_i$, $\sigma_i$ $V_a$, $\sigma$ are the amplitude and dispersion of the signal before and after the ADC, $\sigma i^2 = N+I$; N is the Gaussian noise power; and I is the sinusoidal interference power.

The $V_a, \sigma_a$ for the three-level analog-to-digital converter can be calculated from the following calculations $$P(Va=+1) = \int_{\Delta-V_i}^{\infty} H(y)dy,$$

$$P(Va=-1) = \int_{-\infty}^{-\Delta-V_i} H(y)dy,$$

$$P(Va=0) = \int_{-\Delta-V_i}^{\Delta-V_i} H(y)dy,$$

where $(V_a=+1)$; $(V_a=-1)$; and $(V_a=9)$ are the probability of generation of values +1, −1, 0 at the output of the ADC with the presence of the input signal $V_i$ and quantization threshold Δ. The distribution density of input signal amplitude H(y) is determined from the common probability distribution of the amplitude of the Gaussian and sinusoidal interference:

$$H(y) = \int_{-\infty}^{+\infty} \rho(v)G(y-v)dv;$$

$$\rho(v) = \frac{1}{\pi\sqrt{1-(V/V_0)^2}}, |V| \leq V_0$$

$$\rho(v)=0, |V|>V_0$$

is the sine-wave signal distribution; and $$G(v) = \frac{1}{\sqrt{2\pi\sigma^2}} e^{-v^2/2\sigma^2},$$

is the Gaussian thermal noise distribution characterized completely by the dispersion σ. For numerical calculations the values H(y) and P(Va) as the infinite limits of integration are replaced by values, where the Gaussian distributions function may be considered equal to zero. Usually, the value 3σ is sufficient. Thus, the formulas of calculations will take a form $$P(Va=1) = \int_{\Delta-V_i}^{V_0+3\sigma} H(y)dy; \text{ and}$$

$$P(Va=-1) = \int_{-V_0-3\sigma}^{-\Delta-V_i} H(y)dy;$$

Where $V_0$ is the amplitude of sinusoidal interference.

The value V, is calculated proceeding from the values of probability P:

$E(V_a)=V_a+(-1)*P(V_a=-1)+(+1)*P(V_a=+1)$

Providing allowance for the smallness of $V_a$:

$\sigma a \equiv E(V^2{}_a)=P(V_a=-1)+P(V_a=+1)$.

Thus, it is possible to calculate the effective gain G knowing the ratio between the amplitudes of the signal being detected, sinusoidal interference signal and Gaussian noise dispersion.

The analysis of the dependence of the optimal value G on $\Delta$ and Vi has shown that when Vi $<<V_0$, $V_0<<\sigma$, G very poorly depends on Vi. Depending on the ratio of the sinuisoidal interference amplitude to the noise dispersion $V_0/\sigma$, we may offer the following simplified choice of installation of the thresholds $\Delta$:

At $V_0 \leq 0.5\sigma$, the amount of 0 th counts =50%, the amount of +1=50%; at $0.5\sigma<V_0<2\sigma$, the amount of 0 th counts =70%, that of ±130%; at $V_0>2\sigma$ the amount of 0 th counts =85%, the amount of ±1=15%.

The above analysis has been made for the case of the three-level quantization, however, it can easily be extended for ADC with any number of the levels.

It should also be noted that the narrow-band interference detector may be made in the form of a tracking channel correlator with disconnected code generator, i.e. a code generator should simply generate 1 instead of a pseudonoise sequence.

PREFERRED EMBODIMENTS OF THE INVENTION

Figure 1:
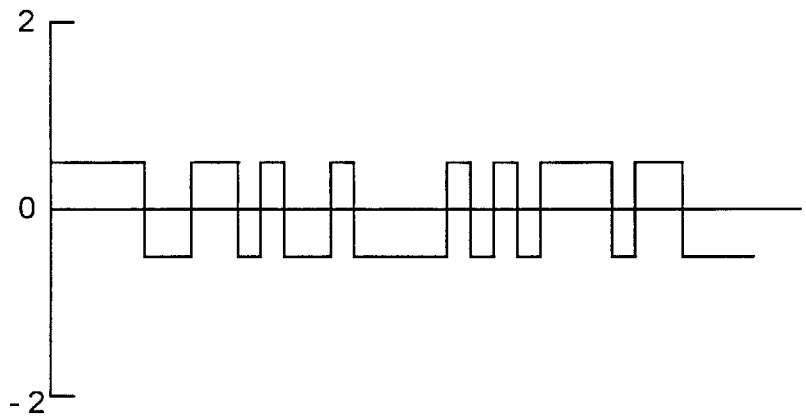
FIG. 1 is a graph illustrating the effect of the narrow-band interference on the PNS reception and on the choice of quantization threshold $\Delta$.
Figure 1:
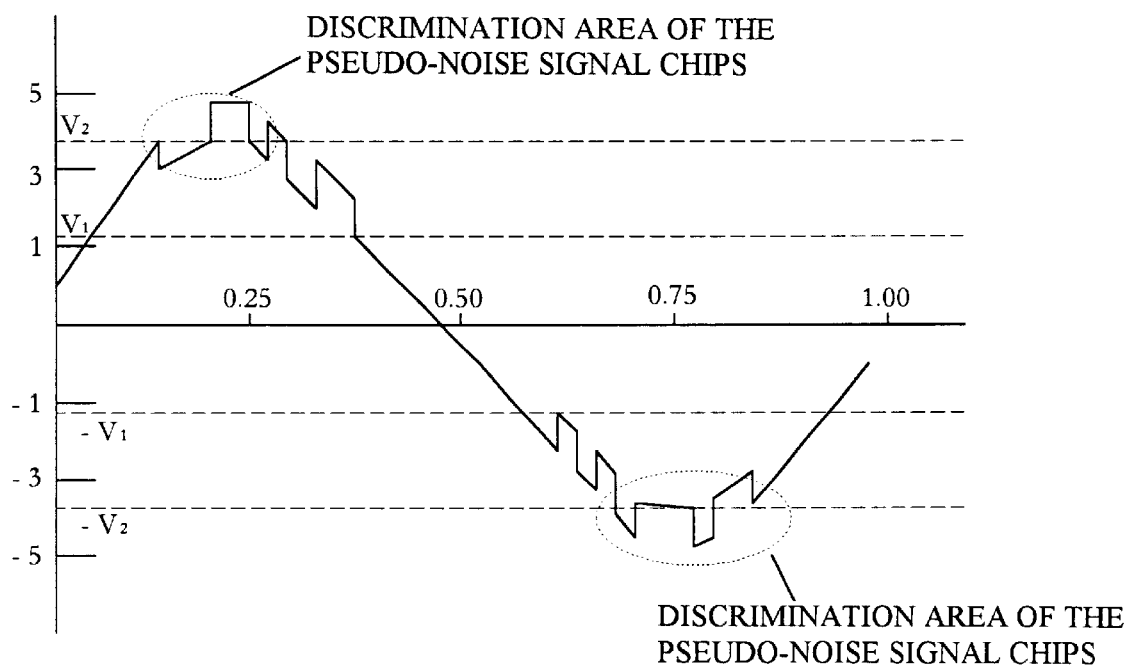

The drawing in FIG. 1 is an illustrative graph demonstrating the importance of the choice of the quantization thresholds at the presence of sinusoidal interference. FIG. 1(a) demonstrates the desired signal PNS, while FIG. 1(b) shows the PNS together with the narrow-band interference. It can readily be seen that at an increase of the quantization threshold $V_2>V_1$, the number of PNS chips which can unambiguously be distinguished on the sine-wave noise background increases.

Figure 2:
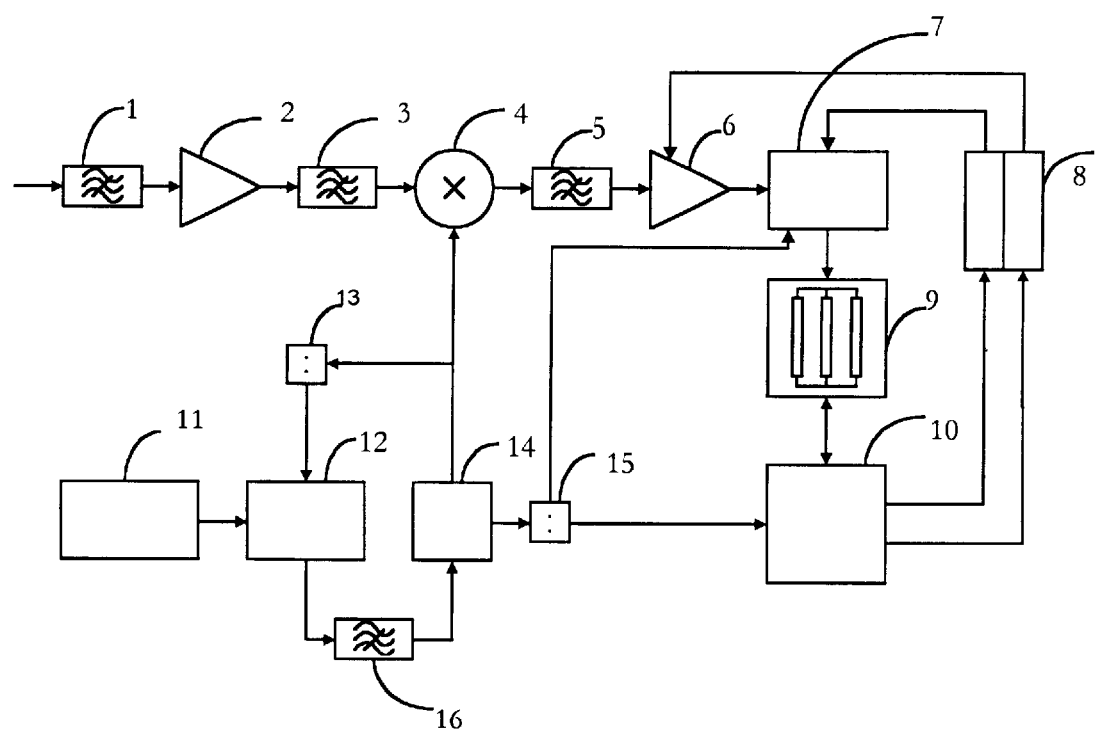
FIG. 2 is a block diagram of the PNS digital receiver.

A block diagram of the PNS receiver is shown in FIG. 2. The receiver may conditionally be divided into a radio-frequency part and a digital part. The standard radio-frequency part consists of an input radio-frequency block comprising a first high-frequency band-pass filter; 1, a low-noise amplifier 2 and a second high-frequency band-pass filter 3 connected in series and performing preliminary amplification and filtering of the input signal. The amplified signal is converted into an intermediate frequency in a mixer 4 whose output is connected to an IF band-pass filter 5, suppressing the high-frequency harmonics. Applied to the second input of the mixer 4 is a signal of a voltage-controlled generator (VCG) 14 which, in turn, is controlled by an AFC loop formed by reference generator 11, a divider 13, a phase detector 12, and a low-frequency filter 16. The voltage-controlled generator 14 together with a divider 15 is also a source of a reference frequency for operation of the ADC 7 and processor 10.

The signal from the output of the IF filter 5 is applied to the input of the AGC 6, whose amplification factor is controlled by a processor with the use of digital signals converted into a control voltage in the digital-to-analog converter (DAC) 8. Such a circuit of a radio-frequency channel can be realized both for the GPS and GLONASS signals depending on the selection of the division factors in the dividers 13 and 15. The analog signal amplified in the AGC circuit is digitized in the multi-level analog-to-digital converter 7. The ADC 7 has a control input for controlling the value of the quantization thresholds which is connected to the output of the processor 10 through the DAC 8.

After digitization, the signal is applied to the input of a multichannel correlator 9, which performs tracking and decoding of the specific PNS and detects the narrow-band interference. The processor 10 reads the information from the accumulators storing the quadrature outputs of the correlator 9; controls the operation of the tracking channel by determining the combination of the code sequence of the GPS and assigned frequencies for the GLONASS; sets the frequency of the master generator and the frequency of the code generator for correlator channels by closing the cycles of tracking the frequency and code; generates the digital control signals for controlling the gain in the AGC 6; and sets the quantization thresholds of ADC 7, which are converted into analogue signals in the double DAC 8. A version for controlling the AGC or thresholds of ADC only is also possible since the change of the amplification in the AGC at a constant quantization threshold is equivalent to the change of the ADC threshold at a constant amplification level. However, the former version is more preferable, as it allows a flexible control to be provided. For example, by controlling the ADC thresholds it is possible to compensate the zero drift in the analog circuit. The ADC 7 can be realized as a quadrature, or as a real quantizer. In the given example a real ADC is considered.

Figure 3:
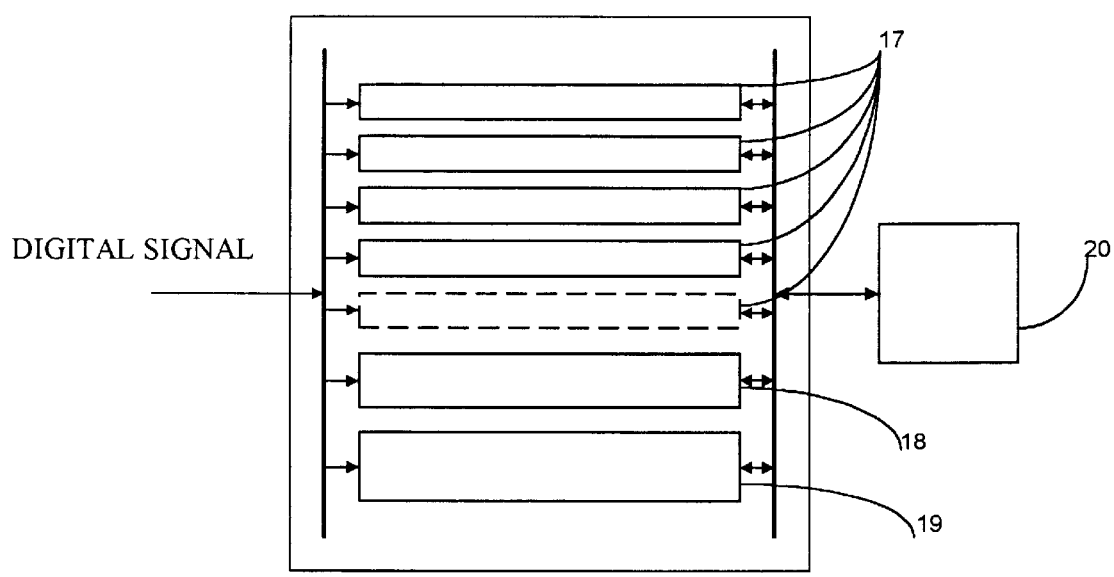
FIG. 3 is a block diagram of the digital correlator including a channel for detecting the narrow-band interference.

FIG. 3 is a block diagram of the digital correlator. The correlator includes a set of identical tracking channels 17 each tracing its own PNS, and a channel for detecting the narrow-band interference 18, and a statistics block 19. The statistics block 19 calculates the number of counts at the ADC output falling in each quantization interval for a specific interval of time, for example, the amount of 0,+1; or −1 counts at the output of the three-level ADC. The counters of the statistics block are read by the processor. The channel for detecting the narrow-band interference takes counts of the accumulators of the correlator quadrature output for the input of the processor 20.

Figure 4:
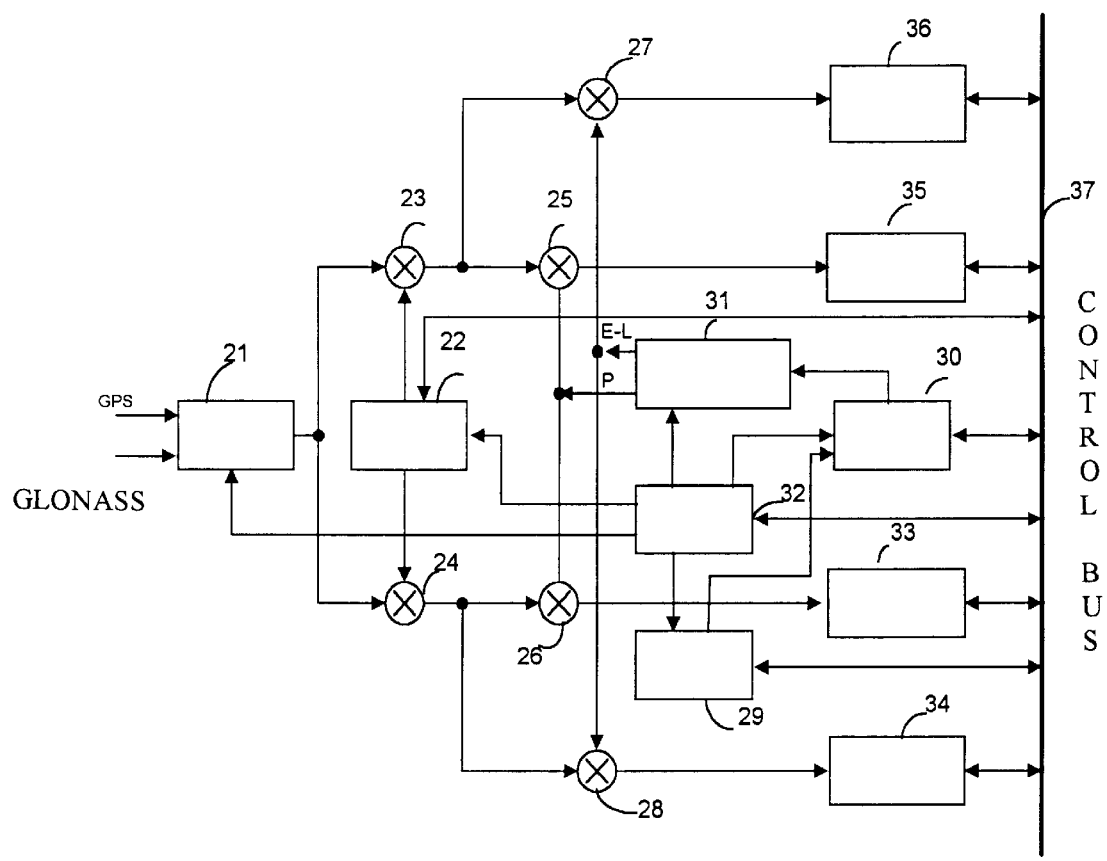
FIG. 4 is block diagram of the tracking channel of a digital correlator.

FIG. 4 is a block diagram of the tracking channel. Applied to the channel input is a digital signal, which can be taken from the output of two radio-frequency channels: GPS and GLONASS. The required channel is selected in an input signal switching circuit 21, and combined with the digital signal from a carrier generator 22 in the quadrature mixers 23; and 24. Then the quadrature components of the signal with a removed carrier are multiplied with the exact copy of the code sequence (P), as well as with the difference (early-minus-late) copy of the signal (E-L) in the multipliers 27 and 28.

The copy of the pseudorandom coding sequence is formed as a result of the following operations: the code-frequency generator 29 forms a train of clock pulses which is applied to the input of a PSS generator 30 which modulates the input train with the help of the unique code of a pseudorandom sequence (PSS). The resulting pulse train is fed to the input of a delayed PSS shaper 31, which in the tracking mode forms a punctual and differential PSS at the output. In search mode the shaper delayed PSS 31 forms early and late copies of the PSS signal. The operating modes of the channel are controlled with the help of a channel control register 32 whose input is connected through a bi-directional bus 37 to the processor and the outputs are connected to the units 21, 22, 29, 30, and 31, determining the channel operation. The results of the correlation from the output of the multipliers 25, 26, 27, and 28 are stored in the accumulators 33, 34, 35, and 36, which are read by the processor through data bus 37. To check the search and tracking, the processor performs recording and reading from the units 22, 29, 30, and 32. During the operation the processor executes recording and reading of the information from the respective units of the tracking channel.

The register for controlling the channel 32 contains information on the system (GPS/GLONASS) and information on the operating modes of the channel (search/diagnostics), which is read by the processor which, in turn, can change these parameters of the register by checking the channel operation. The carrier generator 22 produces a full phase of a carrier frequency for the processor output at the moment of measurement. The processor, in turn, records in the carrier generator new frequency values, controlling the frequency-tracking process.

The code-frequency generator 29 calculates the full phase of the code at the moment of measurement for feeding it to the processor and defining the pseudo-range. In turn, the processor records in the generator the new values of the frequency code, performing the code tracking process. The PSS generator 30 comprises registers forming a binary pseudonoise sequence, which can be read and modified by the processor, allowing the system to assign the channel for tracking the concrete PNS.

Figure 5:
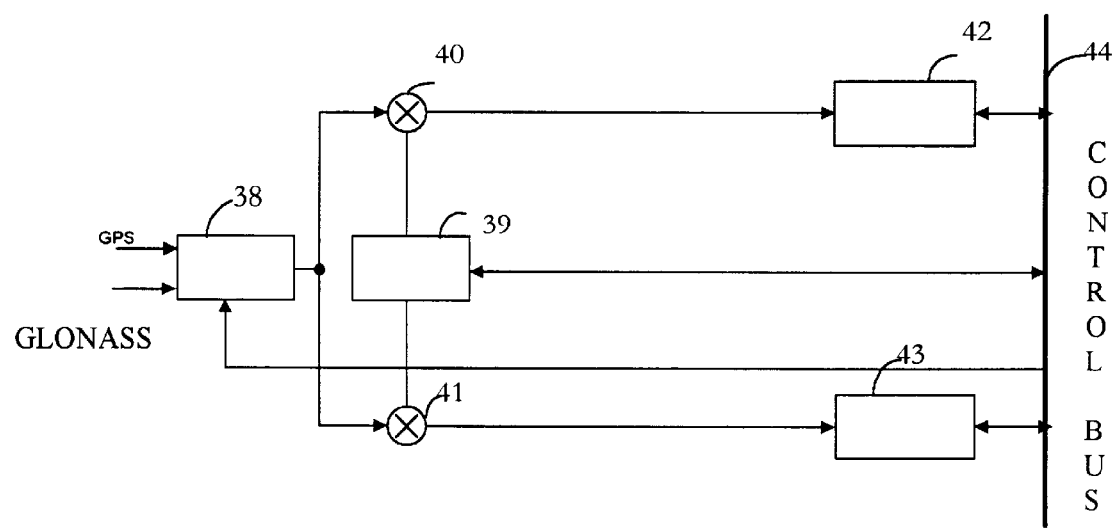
FIG. 5 is a block diagram of the channel of the digital correlator for detecting the narrow-band interference.

Shown in FIG. 5 is a block diagram of the narrow-band interference detecting channel. It may be seen that the given channel is a simplified circuit of the tracking channel. The digital signal from the output of the input signal switching circuit 38 is applied to the input of the quadrature mixers 40, and 41, where it is multiplied with the quadrature outputs of the digital carrier generator 39. The correlation results are stored in the accumulators 42, and 43 which can be read by the processor through a bus 44.

Figure 6:
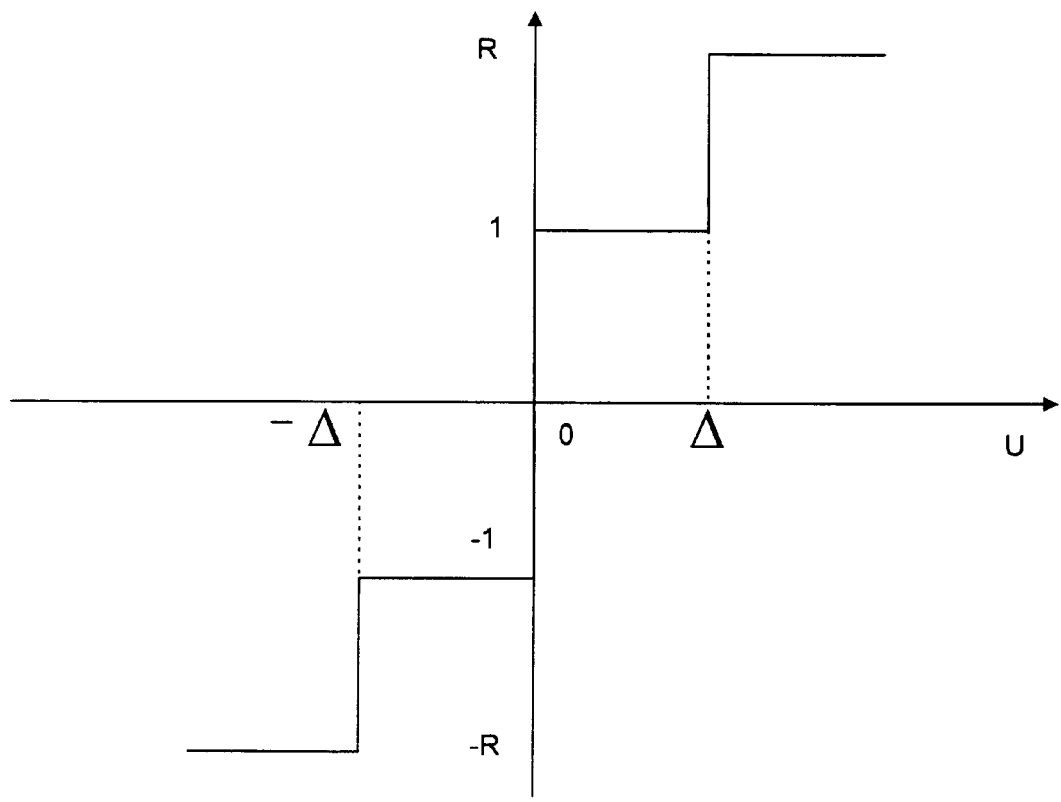
FIG. 6 is a graph of the value at the ADC output for a two-bit four-level quantizer.
Figure 7:
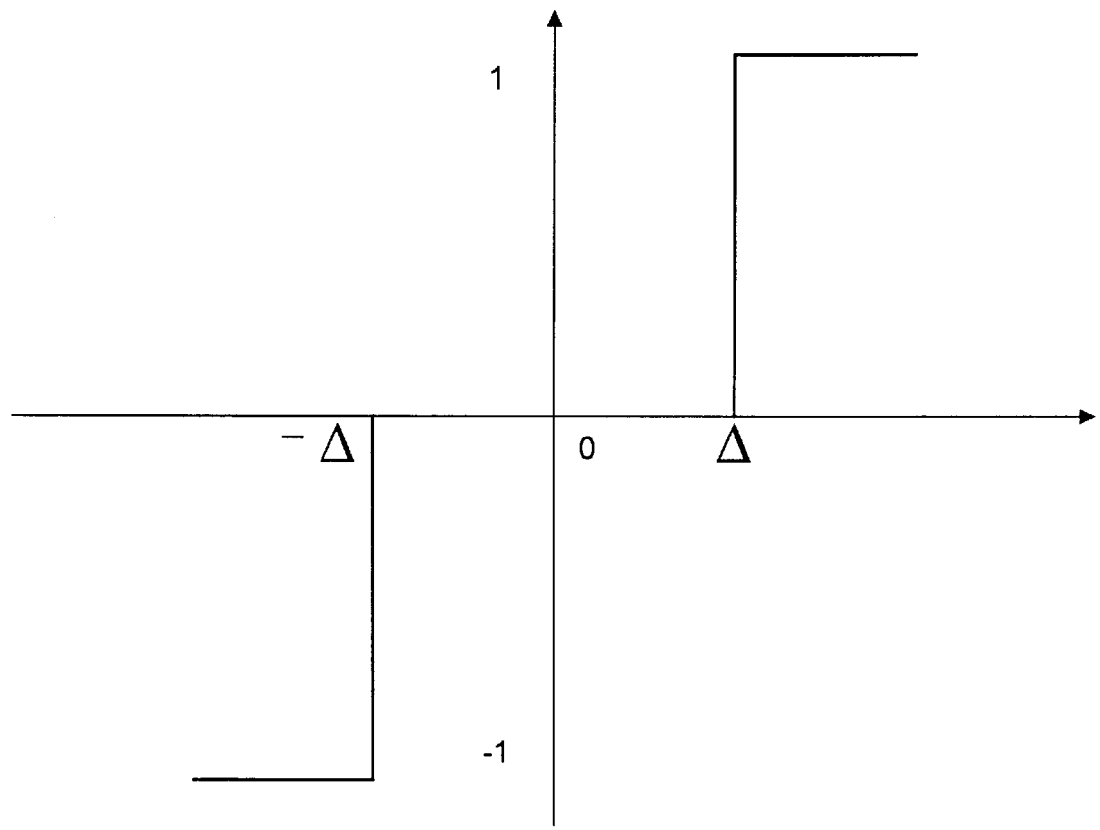
FIG. 7 is a graph of the value at the ADC output for a two-bit three-level quantizer.

FIG. 5 and FIG. 6 characterize the operation of the two-bit analog-to-digital converter. FIG. 5 illustrates the operation of the four-bit ADC with weight coefficients ±R. The signals with $0<U<\Delta$, $-\Delta<U<0$ correspond to the output ±1. The signals $\Delta<U$, $U<\Delta$ corresponds to the outputs ±R, where the weight coefficient R, generally, can vary. FIG. 6 illustrates the operation of the three-level ADC, in which the inputs $U<-\Delta$, $-\Delta<U<\Delta$, $\Delta<U$ corresponds to the outputs −1,0,+1.

Thus, from what is described above, it is clear that the claimed digital receiver for a global positioning system is technically feasible, is industrial, is sold, and is directed to the technical task of improved reception of pseudonoise signals for GSP and GLONASS systems under the effect of the narrow-band interference.

What is claimed:

1. A device for reception and decoding of a complex radio signal comprising a plurality of radio signals, modulated by pseudo-noise sequences said device comprising:

a radio-frequency block, an input of which is connected to a receiving antenna and which transforms a high-frequency input signal to an intermediary frequency signal, an automatic gain control block, an input of which is connected to output of the radio-frequency block, which strengthens a signal of intermediate frequency and which has a control input for-adjustment of an amplification factor, an analog-to-digital converter (ADC), the input of which is connected to an output of the automatic gain control block, which contains not less than three levels of quantization, a multichannel digital corrector, the input of which is connected to a digital output of the analog-to-digital converter, and which comprises a set of identical tracking channels, each of which executes tracking and decoding of one signal from the set of transmitted pseudo-noise signals, digital counters, inputs of which are connected to an output of the ADC, executing count of counts falling within each interval of quantization for a specific period, processor device, joint with a digital correlator and said digital counters by means of a bi-directional data bus, the controlling output of which is connected to a controlling input of an automatic gain control block, which reads out the information from channels of said digital correlator, executes closure of tracking cycles of frequency, phase and code of a pseudo-noise signal and controls the operation of correlation channels and that of the automatic gain control block, wherein the multichannel digital correlator comprises an additional channel for detecting the sinusoidal interference comprising digital generator of carrying frequency, quadrature mixers and accumulators, information from output of accumulators is read out by a processor in which the presence (or absence) of interference is detected and the amplitude is evaluated, so that the processor is controlling the amplification of a signal in the automatic gain control block.

2. The device as claimed in claim 1, wherein the analog-to-digital converter comprises a controlling input, connected to a controlling output of the processor device, to improve the precision of fixing the quantization thresholds in relation to an input analogue signal.

3. The device as in claimed in claim 2, wherein the multichannel digital correlator comprises:

a set of identical tracking channels, each of which executes tracking and decoding of one signal from each of transmitted pseudonoise signals, and digital counters, the tracking channel of a multichannel digital correlator comprises:

a generator of a response of a delayed signal, quadrature mixers, and accumulators, the generator of a response of a, delayed signal comprises:

the digital controlled generator of carrying frequency and digital controlled generator of code, which, following an external command, is disconnected so that the signal from an output of the generator of the carrying frequency is not modulated, and, the tracking channel will be transformed to the channel for detecting the sinusoidal interference.

4. A receiver for reception and decoding of complex radio signals comprising a plurality of signals modulated by pseudo-noise sequence, said receiver comprising a multichannel digital correlator circuit, said circuit comprising:

a set of identical tracking channels, each of which executes tracking and decoding of one signal from a plurality of transmitted pseudo-noise signals; and an additional channel for detecting narrow-band sinusoidal interference.

5. The receiver as claimed in claim 4, wherein said additional channel comprises:

a digital control carrier generator which generates quadrature phase counts;

digital correlators and accumulators for storing the quadrature phase counts; and digital counters for counting a number of counts in each quantanization interval for a predetermined time period.

6. The receiver as claimed in claim 5, further comprising an analog-to-digital converter having an output connected to an input of said multichannel digital correlator, said analog-to-digital converter containing at least three levels of quantanization, wherein in case of a three-level quantanization the number of counts is equal to −1, 0, or +1, calculated in an interval for providing statistical assurance.

7. The receiver as claimed in claim 6, wherein said period is for number of count $>10^4$.

* * * * *